(No Model.)
C. W. WEISS.
GOVERNOR FOR GAS ENGINES.
No. 494,662. Patented Apr. 4, 1893.
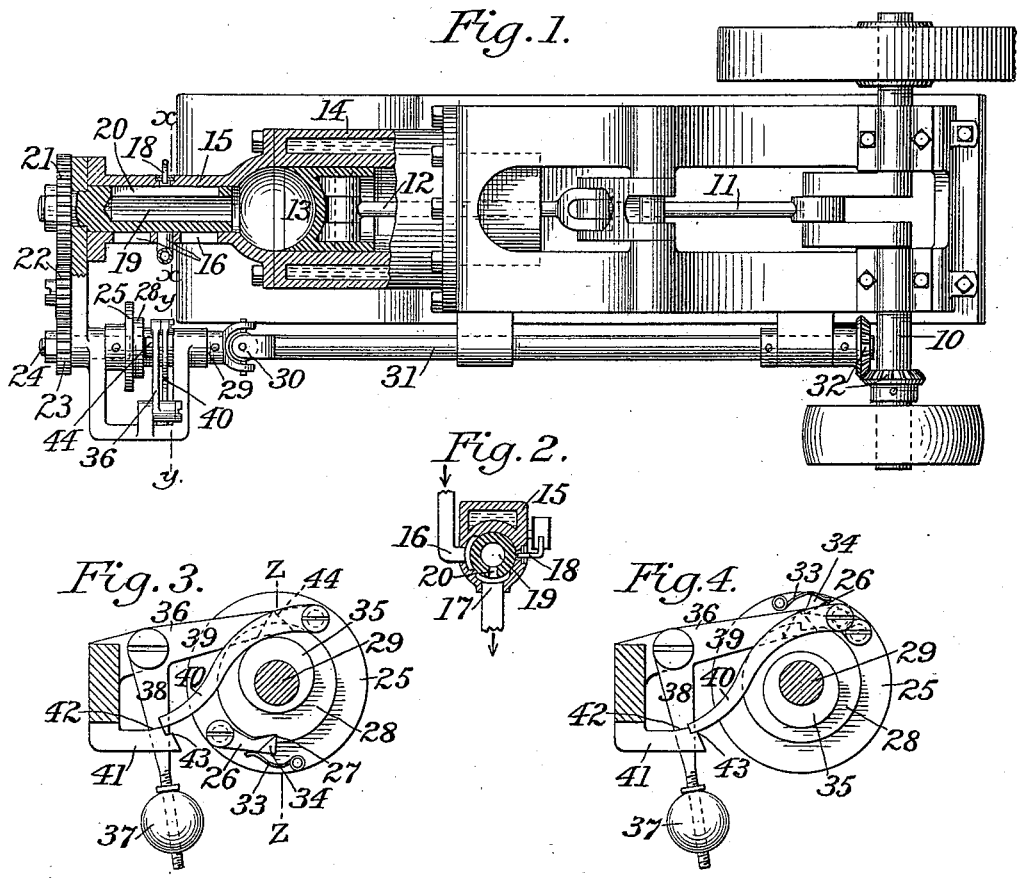
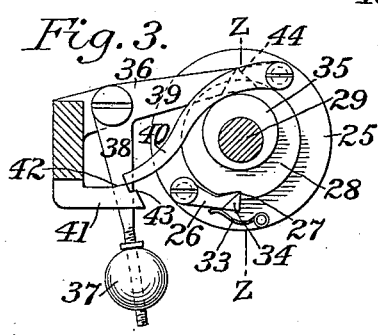
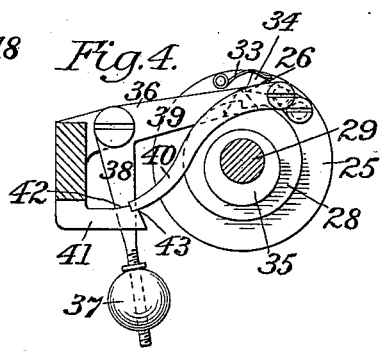
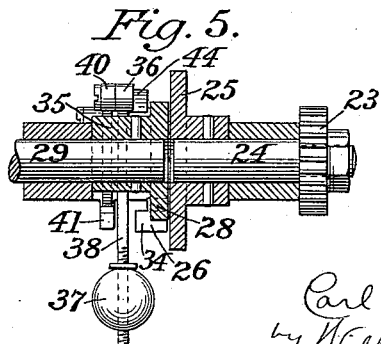
Attest:
A. N. Jesbera.
A. Kidder.
Inventor:
Carl W. Weiss
by William B. Greeley
Atty.

UNITED STATES PATENT OFFICE.

CARL W. WEISS, OF BROOKLYN, NEW YORK.

GOVERNOR FOR GAS-ENGINES.

SPECIFICATION forming part of Letters Patent No. 494,662, dated April 4, 1893.

Application filed May 17, 1892. Serial No. 433,342. (No model.)

*To all whom it may concern:*

Be it known that I, CARL W. WEISS, of Brooklyn, in the county of Kings and State of New York, have invented new and useful Improvements in Governors for Gas-Engines; and I do hereby declare that the following is a full and exact description thereof, reference being had to the accompanying drawings, and to the figures of reference marked thereon, making a part of this specification.

My invention relates to gas engines and is herein described as applied to an engine of the character of that shown in my patent No. 473,685, granted April 26, 1892. Heretofore in such engines, after the governor has once operated, the crank-shaft must make two revolutions before a fresh charge of gas and air can be admitted to the cylinder. The result is that the speed may fall too much and the action of the engine become unsteady.

The main object of my present invention is therefore to provide a valve which shall admit a charge to the cylinder on the next following revolution of the crank-shaft if the speed has fallen to the proper rate.

A further object is to provide for the control of the valves or valve gear of both the gas inlet port and the exhaust port by a single governor so that the latter may be open when the former is closed and the engine thereby permitted to run light so long as the inlet port is closed. I have shown my improved governor as applied to a valve of the character of that described in my said patent and I have so arranged and combined the parts that the valve is stopped with its opening on the exhaust port and with the inlet port closed by the imperforate portion of the side wall of the valve. It will be understood, however, that the general features of the invention are equally applicable to an engine having a single reciprocating valve or to one having independent valves for the inlet port and for the exhaust port.

In the drawings, Figure 1 is a plan view of an engine having my improvement applied thereto, a portion of the cylinder and the valve being shown in horizontal section. Fig. 2 is a section on the line $x-x$ of Fig. 1. Fig. 3 is a section on the line $y-y$ of Fig. 1, on a larger scale. Fig. 4 is a view similar to Fig. 3, but showing the parts in different positions. Fig. 5 is a longitudinal section on the line $z-z$ of Fig. 3.

The crank-shaft 10, connecting-rod 11, piston-rod 12, piston 13 and cylinder 14 may be all as usual or as shown in my said patent. The valve chamber 15 is preferably formed as shown in my said patent, being a cylindrical chamber axially in line with the cylinder 14, open at its forward end, and provided with the air and gas ports 16, exhaust port 17 and igniter 18. Within the valve chamber is fitted to rotate the cylindrical hollow valve 19, open at its forward end and provided with the opening 20. The stem of the valve carries a gear 21 which is driven through intermediate gearing 22 from a gear 23 on a short-shaft 24. As the shaft 24 rotates synchronously with the crank-shaft 10 the gears are related, substantially as shown, so that the valve shall rotate once for every two revolutions of the crank-shaft, and the ports of the valve chamber are so arranged with reference to the valve that on the first forward movement of the piston the charge of gas and air shall be drawn into the cylinder, that on the first return movement the charge of gas and air shall be compressed, that as the piston begins its second forward movement the charge shall be exploded, and that during the second return movement the dead gases shall be expelled from the cylinder.

The short-shaft 24 has fixed thereto a disk 25, or it might be an arm, which has pivoted thereon a pawl 26. The said pawl is adapted to engage a notch 27 in the periphery of a disk 28 which is fixed to a shaft 29. The latter is driven synchronously with the crank-shaft 10 through a universal joint 30, a shaft 31, and bevel gears 32. The pawl 26 is pressed by a spring 33 so that it shall normally be in engagement with the notch 27, and the valve be thereby rotated as described, and the pawl is provided with a laterally projecting lug 34 for a purpose presently to be described. The shaft has also fixed thereon or formed with the disk 28 a cam or eccentric 35. A bell-crank pendulum lever 36 is pivoted to a fixed point and has, as usual, an adjustable weight 37 upon its depending arm 38, while its horizontal arm 39 rests normally upon said eccentric. Near the outer end of the horizontal arm 39 is pivoted a stop-arm 40 which is inclined downward toward the pivot of the pendulum lever and also rests normally upon the eccentric 35. A fixed stop 41 is placed in such position relative to the stop-arm 40 that when the engine is running at the proper speed the end of the arm rests upon the upper face 42 of the stop 41, while if the parts assume the position shown in Fig. 4 the end of the stop-arm rests against the face 43 of the stop 41. The arm 39 bears upon the side next the pawl on an incline 44 which stands in the plane of revolution of the projection on the side of the pawl but normally drops below the path of the said projection so that the pawl is unaffected by it.

The operation of the device will be understood readily from the foregoing description. So long as the engine is running at the predetermined speed the horizontal arm of the pendulum lever will rest upon the periphery of the eccentric, and the incline carried thereby will fall below the path of the projection carried by the clutch pawl. If, however, the speed be increased materially above the normal the horizontal arm of the pendulum lever will not fall quickly enough to remain in contact with the low part of the eccentric, being partly counterbalanced by the adjustable weight, while the stop-arm 40 will fall quickly and, the relation of its pivot with respect to its bearing on the eccentric being then such as is shown in Fig. 4, the end of the stop-arm will rest against the face of the stop 41 and will therefore hold the pendulum lever in the position shown with the incline thereon in the path of the projection on the clutch pawl. The clutch pawl will therefore be raised as it moves over the incline and the shaft will be uncoupled from its driver, stopping the further movement of the valve. The parts are so related that the valve is stopped with its opening on the exhaust port so that the engine shall run light. On the next succeeding revolution of the crank-shaft the high part of the eccentric will lift the stop-arm from the face 43 of the stop, thereby allowing the horizontal arm to fall and the clutch pawl to engage again the notch in the disk.

It will be observed that the arrangement shown in the drawings and described above provides for a positive engagement of the valve gear with the continuously rotating part. This is an advantage for the reason that it avoids the danger of the rebounding of any of the parts concerned in the transmission of the movement and thereby increases the reliability of the mechanism.

It is obvious that the stop-arm, instead of being pivoted to the pendulum lever and adapted to engage a fixed stop, might be pivoted upon a fixed part and adapted to engage a projection carried by the pendulum lever, this arrangement being simply the reverse of that shown. Furthermore, the function of the governor being simply to control the engagement of the continuously moving part with the valve-gear, the exact form of the clutch is immaterial. Likewise the form of the valve-gear may be varied without departing from the spirit of my invention, and the term "valve-gear," as employed herein, may be understood to cover either the single rotary valve with its operating gear-wheels, or a single reciprocating valve with its slide, or independent valves for the inlet and exhaust ports operated from a common part, or any other well known equivalent arrangement, the particular arrangement shown having been adopted herein merely as a convenient illustration.

I claim as my invention—

1. The combination with the cylinder of an engine, of a valve chamber having inlet and exhaust ports, valve gear which is caused, when the speed of the engine is too great to close the one and open the other of said ports and to maintain them in that condition and until the speed is reduced, a continuously moving part adapted to have a positive engagement with said valve gear to operate the same positively, and a single governor to control the engagement of said valve gear with said continuously moving part, substantially as shown and described.

2. The combination with the cylinder of an engine, of a valve chamber having inlet and exhaust ports, valve gear which is caused, when the speed of the engine is too great to close the one and open the other of said ports, and to maintain them in that condition and until the speed is reduced, a continuously moving part, a clutch between said continuously moving part and said valve-gear to transmit movement positively from one to the other, and a governor to control said clutch, substantially as shown and described.

3. The combination with the cylinder of an engine, of a valve chamber having inlet and exhaust ports, a valve which is caused when the speed of the engine is too great to close the one and open the other of said ports and to maintain them in that condition and until the speed is reduced, gearing for operating said valve, a continuously moving part, a clutch between said moving part and said gearing, to transmit movement positively from one to the other, and a governor to control said clutch, substantially as shown and described.

4. The combination with the cylinder of an engine, of a cylindrical valve chamber having inlet and exhaust ports about its periphery, a cylindrical, hollow valve communicating with said cylinder and having a single lateral opening, gearing for rotating said valve, a continuously rotating shaft, a clutch between said shaft and said gearing to transmit movement positively from one to the other and a governor to control said clutch, substantially as shown and described.

5. In a governor for engines, the combination of a continuously moving part, valve gear adapted to be connected to said moving part and to be operated thereby, a clutch to connect said gear to said moving part, a cam carried by said moving part, a pendulum lever to control said clutch and having an arm adapted to rest upon said cam, and a pivoted stop arm also adapted to rest upon said cam and to control the position of said pendulum lever, substantially as shown and described.

6. A governor for engines comprising a continuously rotating shaft, a driven shaft adapted to be connected to the first and actuating the valve, a clutch, a cam or eccentric carried by said rotating shaft, a pendulum lever having one arm adapted to rest upon the periphery of said cam or eccentric and to control said clutch, and a pivoted stop-arm to control the position of said pendulum lever, substantially as shown and described.

7. A governor for engines comprising a continuously rotating shaft, a driven shaft adapted to be coupled to the first and actuating the valve, a clutch pawl carried by said driven shaft, a notched disk carried by said continuously rotating shaft and adapted to be engaged by said pawl, a cam or eccentric also carried by said rotating shaft, a pendulum lever having one arm adapted to rest upon the periphery of said cam or eccentric and to control the engagement of said pawl with said disk, and a pivoted stop-arm to control the position of said pendulum lever, substantially as shown and described.

In testimony whereof I have signed my name to this specification in the presence of two subscribing witnesses.

CARL W. WEISS.

Witnesses:
  A. N. JESBERA,
  A. WIDDER.